US011855793B2

(12) United States Patent
Christensen et al.

(10) Patent No.: US 11,855,793 B2
(45) Date of Patent: Dec. 26, 2023

(54) GRAPHICAL USER INTERFACES FOR GROUPING VIDEO CONFERENCE PARTICIPANTS

(71) Applicant: Lenovo (Singapore) Pte. Ltd., Singapore (SG)

(72) Inventors: Tobias Christensen, San Francisco, CA (US); Axel Ramirez Flores, Cary, NC (US); Nathanial Albertson, Apex, NC (US); Matthew Fardig, Boonville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 67 days.

(21) Appl. No.: 17/119,225

(22) Filed: Dec. 11, 2020

(65) Prior Publication Data
US 2022/0191055 A1    Jun. 16, 2022

(51) Int. Cl.
*H04L 12/18* (2006.01)
*G06F 3/048* (2013.01)
(Continued)

(52) U.S. Cl.
CPC .......... *H04L 12/1822* (2013.01); *G06F 3/048* (2013.01); *G06F 40/40* (2020.01); *H04L 12/1831* (2013.01); *H04N 7/155* (2013.01)

(58) Field of Classification Search
CPC . H04L 12/1822; H04L 12/1831; G06F 40/40; G06F 3/048; G06F 40/30; H04N 7/155; H04N 7/147; H04N 7/15
See application file for complete search history.

(56) References Cited

U.S. PATENT DOCUMENTS 5,195,086 A    3/1993  Baumgartner et al.
6,075,571 A    6/2000  Kuthyar et al.
(Continued)

OTHER PUBLICATIONS

Author unkown, Optimizing Meeting Effectiveness Via Subgroup Creation Techniques, An IP.com Prior Art Database Technical Disclosure, IPCOM000180241D, Mar. 5, 2009, 4 pages (Year: 2009).*

(Continued)

*Primary Examiner* — Patrice L Winder
(74) *Attorney, Agent, or Firm* — John M. Rogitz; John L. Rogitz

(57) ABSTRACT

In one aspect, an apparatus may include a processor and storage accessible to the processor. The storage may include instructions executable to identify first, second, third, and fourth participants that are to engage in video conferencing. The instructions may also be executable to access data related to the participants. The instructions may then be executable to, based on the data, group the first and second participants together for a first video conference and group the third and fourth participants together for a second video conference. Based on the grouping, the instructions may then be executable to provide a graphical user interface including video feeds of the participants according to the groupings and allowing a fifth participant to enter the different groups to converse audibly with the different groups. The groupings may be made based on past participation in other video conferences and/or traits of the respective participants, for example.

20 Claims, 7 Drawing Sheets

(51) Int. Cl.
*G06F 40/40* (2020.01)
*H04N 7/15* (2006.01)

(56) References Cited

U.S. PATENT DOCUMENTS

| | | | |
|---|---|---|---|
| 6,138,144 | A | 10/2000 | DeSimone et al. |
| 6,584,077 | B1 | 6/2003 | Polomski |
| 7,362,349 | B2 | 4/2008 | Nelson et al. |
| 7,412,392 | B1 | 8/2008 | Satapathy |
| 7,499,075 | B2 | 3/2009 | Miceli |
| 7,558,221 | B2 | 7/2009 | Nelson et al. |
| 9,013,539 | B1 | 4/2015 | Fulay et al. |
| 9,113,032 | B1 | 8/2015 | Mey et al. |
| 9,143,729 | B2 | 9/2015 | Anand et al. |
| 9,420,108 | B1* | 8/2016 | Bostick .............. H04L 65/403 |
| 9,691,412 | B2* | 6/2017 | Totzke ................. G06Q 10/10 |
| 9,710,142 | B1* | 7/2017 | Vendrow .............. H04L 65/403 |
| 9,781,385 | B2 | 10/2017 | Ma et al. |
| 10,250,851 | B1* | 4/2019 | Harpur .................. G10L 25/63 |
| 10,348,777 | B2 | 7/2019 | Knotts |
| 2003/0105820 | A1 | 6/2003 | Haims et al. |
| 2005/0264648 | A1 | 12/2005 | Ivashin et al. |
| 2006/0164508 | A1 | 7/2006 | Eshkoli et al. |
| 2006/0184624 | A1 | 8/2006 | Thukral |
| 2007/0121530 | A1 | 5/2007 | Vadlakonda et al. |
| 2009/0089683 | A1 | 4/2009 | Thapa |
| 2009/0216835 | A1 | 8/2009 | Jain et al. |
| 2011/0271210 | A1 | 11/2011 | Jones et al. |
| 2011/0279634 | A1 | 11/2011 | Periyannan et al. |
| 2011/0279635 | A1 | 11/2011 | Periyannan et al. |
| 2012/0062442 | A1 | 3/2012 | Locker et al. |
| 2012/0166534 | A1* | 6/2012 | Bentley .............. H04L 12/1822 709/204 |
| 2012/0182384 | A1* | 7/2012 | Anderson ........... H04L 65/1073 348/14.09 |
| 2012/0327175 | A1 | 12/2012 | Couse |
| 2014/0192141 | A1 | 7/2014 | Begeja et al. |
| 2014/0253672 | A1* | 9/2014 | Bank .................. H04L 12/1827 348/14.08 |
| 2014/0267550 | A1* | 9/2014 | Nimri ................... H04N 7/152 348/14.09 |
| 2014/0267571 | A1 | 9/2014 | Periyannan et al. |
| 2014/0267576 | A1 | 9/2014 | Hiller et al. |
| 2014/0313278 | A1 | 10/2014 | Periyannan et al. |
| 2014/0362165 | A1* | 12/2014 | Ackerman .......... H04L 65/4076 348/14.07 |
| 2015/0022625 | A1 | 1/2015 | Thapa |
| 2015/0089399 | A1* | 3/2015 | Megill ................ H04L 12/1813 715/753 |
| 2015/0304607 | A1* | 10/2015 | Bader-Natal ........ H04L 65/1069 348/14.08 |
| 2016/0099986 | A1* | 4/2016 | Bentley .............. G06Q 10/1095 709/204 |
| 2017/0200128 | A1* | 7/2017 | Kumahara ............. H04L 67/53 |
| 2018/0101760 | A1 | 4/2018 | Nelson et al. |
| 2018/0139413 | A1* | 5/2018 | Diao ................... H04L 65/1069 |
| 2018/0176639 | A1 | 6/2018 | Sprenger et al. |
| 2018/0204576 | A1* | 7/2018 | Dhoot ................. H04L 65/1083 |
| 2018/0337968 | A1 | 11/2018 | Faulkner |
| 2019/0124128 | A1 | 4/2019 | Bader-Natal et al. |
| 2019/0166330 | A1 | 5/2019 | Ma et al. |
| 2019/0215347 | A1 | 7/2019 | Liau |
| 2020/0302817 | A1* | 9/2020 | Williams .................. G09B 7/02 |
| 2020/0314564 | A1* | 10/2020 | Feilner .................. H04M 3/568 |
| 2020/0411038 | A1 | 12/2020 | Reynolds |
| 2021/0051035 | A1* | 2/2021 | Atkins ................... H04N 7/155 |

OTHER PUBLICATIONS

"Natural Language Processing", Wikipedia, retrieved on Oct. 27, 2020 from https://en.wikipedia.org/wiki/Natural_language_processing.
"Sentiment analysis", Wikipedia, retrieved on Oct. 27, 2020, from https://en.wikipedia.org/wiki/Sentiment_analysis.
"Speech segmentation", Wikipedia, retrieved on Oct. 27, 2020 from https://en.wikipedia.org/wiki/Speech_segmentation.
"Text segmentation", Wikipedia, retrieved on Oct. 27, 2020 from https://en.wikipedia.org/wiki/Text_segmentation.
Christensen et al., "Graphical User Interfaces for Monitoring Video Conferences", file history of related U.S. Appl. No. 17/119,060, filed Dec. 11, 2020.
"About Pidgin", Pidgin, retrieved from https://pidgin.im/about/.
Lee et al., "Facilitation of Two or More Video Conferences Concurrently", file history of related U.S. Appl. No. 16/792,209, filed Feb. 15, 2020.
VanBlon et al., "Systems and Methods to Merge Data Streams From Different Conferencing Platforms", file history of related U.S. Appl. No. 16/370,207, filed Mar. 29, 2019.

* cited by examiner

GRAPHICAL USER INTERFACES FOR GROUPING VIDEO CONFERENCE PARTICIPANTS

FIELD

The present application relates to technically inventive, non-routine solutions that are necessarily rooted in computer technology and that produce concrete technical improvements.

BACKGROUND

As recognized herein, there may be instances where a video conference group leader wishes to break the group up into sub-video conferences for smaller groups to perform tasks, work toward specific goals, discuss certain things, etc. As also recognized herein, current video conference systems fail to adequately distribute and assess how the participants of the concurrent sub-video conferences interact with each other even though that may be useful for the system to enhance video conferencing. Thus, there are currently no adequate solutions to the foregoing computer-related, technological problem.

SUMMARY

Accordingly, in one aspect an apparatus includes at least one processor and storage accessible to the at least one processor. The storage includes instructions executable by the at least one processor to identify first, second, third, and fourth participants of a first video conference. The instructions are also executable to access data related to the first, second, third, and fourth participants, where the data is generated based on participation in the past of the first, second, third, and fourth participants in a second video conference. The second video conference is different from the first video conference. Further, the instructions are executable to, based on the data, group the first and second participants together for a first sub-conference and group the third and fourth participants together for a second sub-conference different from the first sub-conference such that the first and second participants are not grouped together with the third and fourth participants for the first and second sub-conferences. The instructions are also executable to, based on the grouping, facilitate the first sub-conference of the first participant with the second participant and facilitate the second sub-conference of the third participant with the fourth participant.

So, for example, facilitating the first and second sub-conferences may include presenting a graphical user interface (GUI) on a display. The GUI may include video feeds of the first, second, third, and fourth participants according to the groupings. The GUI may also include a first selector that is selectable to allow a fifth participant to converse audibly in the first sub-conference and a second selector that is selectable to allow the fifth participant to converse audibly in the second sub-conference. The fifth participant may be different from the first, second, third, and fourth participants.

In some example implementations, the data may be generated at least in part based on execution of sentiment analysis. The sentiment analysis may be executed using images of the first, second, third, and fourth participants from the second video conference, and/or using audio of the first, second, third, and fourth participants speaking during the second video conference. Additionally or alternatively, the data may be generated at least in part based on execution of natural language processing.

Also in some examples, the first, second, third, and fourth participants may be grouped together based on respective average talking times of the first, second, third, and fourth participants at least during the second video conference, where the average talking times may be indicated via the data. The first, second, third, and fourth participants may also be grouped together based on respective overall sentiments of the first, second, third, and fourth participants at least during the second video conference, where the overall sentiments may be indicated via the data. Still further, the first, second, third, and fourth participants may be grouped together based on respective topic interests of the first, second, third, and fourth participants at least during the second video conference, where the topic interests may be indicated via the data and the data may be generated based on execution of topic segmentation.

In some example implementations, the apparatus may include a server that facilitates the first and second sub-conferences.

In another aspect, a method includes identifying first, second, third, and fourth participants that are to engage in video conferencing. The method then includes accessing data related to the first, second, third, and fourth participants, where the data is generated based on past video conference participation of the first, second, third, and fourth participants. The method also includes, based on the data, grouping the first and second participants together for a first video conference and grouping the third and fourth participants together for a second video conference different from the first video conference. The first and second participants are not grouped together with the third and fourth participants for the first and second video conferences. The method then includes, based on the groupings, providing a graphical user interface (GUI) presentable on a display. The GUI includes video feeds of the first, second, third, and fourth participants according to the groupings. The GUI also includes a first selector that is selectable to allow a fifth participant to converse audibly in the first video conference and a second selector that is selectable to allow the fifth participant to converse audibly in the second video conference. The fifth participant is different from the first, second, third, and fourth participants.

Thus, in some example implementations the method may be executed at least in part by a server that facilitates the first video conference of the first participant with the second participant and that facilitates the second video conference of the third participant with the fourth participant.

Also in some example implementations, the first and second participants may be grouped together for the first video conference based on the data indicating that the first and second participants disagreed on a topic in the past.

Still further, in some example embodiments the data may be generated at least in part based on execution of sentiment analysis. In these embodiments, the sentiment analysis may be executed using images of the first, second, third, and fourth participants from the past video conference participation, and/or using audio of the first, second, third, and fourth participants speaking during the past video conference participation.

Still further, in some examples the past video conference participation may include participation in plural past video conferences. Thus, the first, second, third, and fourth participants may be grouped together based on respective average talking times of the first, second, third, and fourth participants across the plural past video conferences. The average talking times may be indicated via the data.

Additionally, note that in some examples the data may be generated at least in part based on execution of natural language processing.

In still another aspect, at least one computer readable storage medium (CRSM) that is not a transitory signal, includes instructions executable by at least one processor to identify first, second, third, and fourth participants that are to engage in video conferencing. The instructions are also executable to access data related to the first, second, third, and fourth participants and, based on the data, group the first and second participants together for a first video conference and group the third and fourth participants together for a second video conference different from the first video conference. The first and second participants are not grouped together with the third and fourth participants for the first and second video conferences. The instructions are also executable to, based on the grouping, provide a graphical user interface (GUI) presentable on a display. The GUI includes video feeds of the first, second, third, and fourth participants according to the groupings.

In some example implementations, the data may be generated based on past video conference participation of the first, second, third, and fourth participants.

Also in some example implementations, the GUI may include a first selector that is selectable to allow a fifth participant to converse audibly in the first video conference and a second selector that is selectable to allow the fifth participant to converse audibly in the second video conference. The fifth participant is different from the first, second, third, and fourth participants.

Additionally, in some examples the data may indicate one or more respective traits of the first, second, third and fourth participants such that the first, second, third, and fourth participants are grouped together at least in part based on their respective one or more traits. The one or more respective traits may include a particular gender of the respective participant, a particular color of clothing of the respective participant, and/or a particular age or age range of the respective participant.

The details of present principles, both as to their structure and operation, can best be understood in reference to the accompanying drawings, in which like reference numerals refer to like parts, and in which:

DETAILED DESCRIPTION

Figure 1:
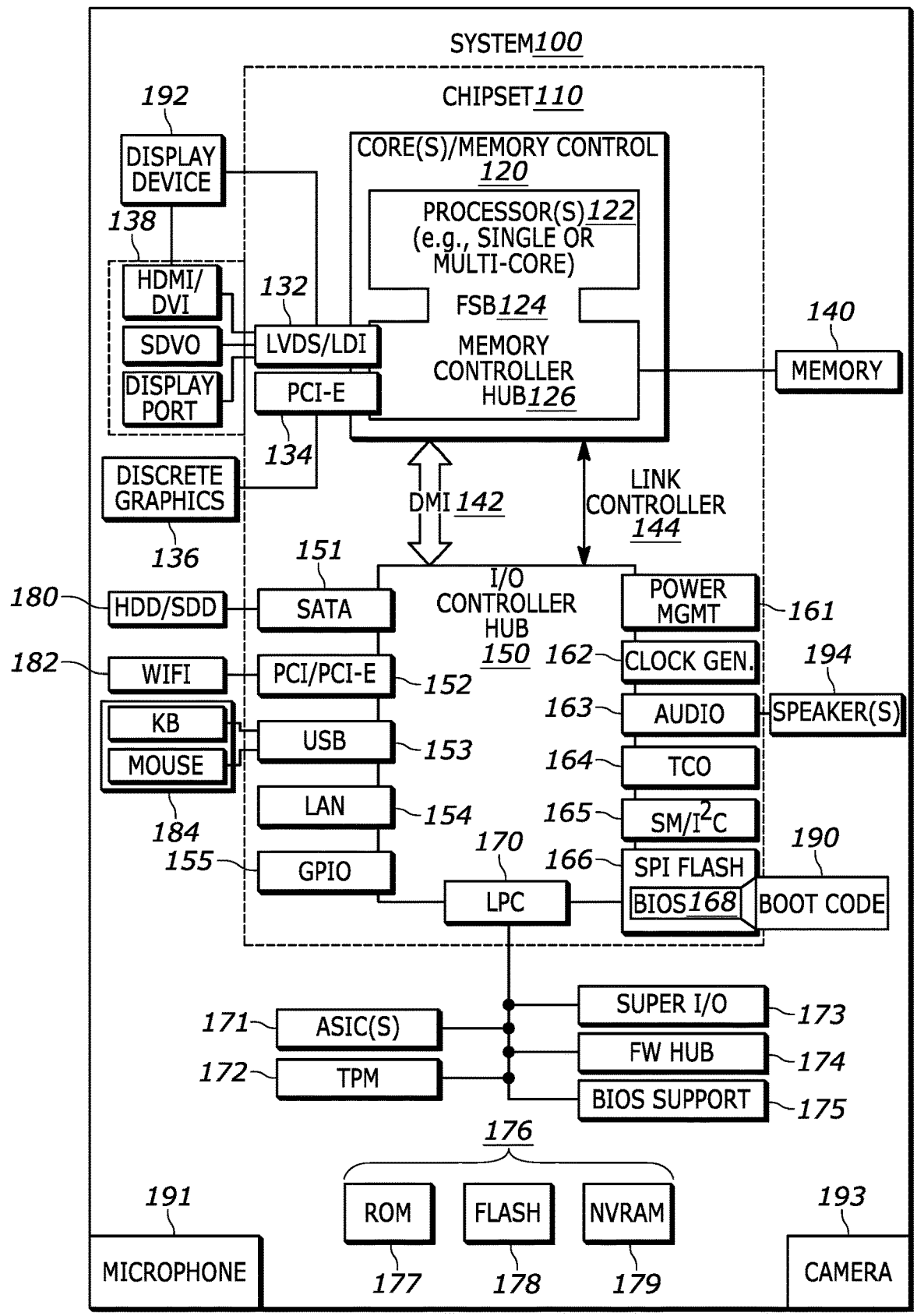
FIG. 1 is a block diagram of an example system consistent with present principles.

Among other things, the present disclosure describes devices that use natural language processing, sentiment analysis, etc. to allow for distribution of conference attendees into functional workgroups or breakout sessions. Thus, groups may be created that are highly functional in order to allow each group a higher chance to succeed at the tasks it is given. The intelligent distribution system may divide people into groups using metadata and information captured before the meeting or to even make suggestions after the meeting has started.

Thus, data captured from past conferences or identified in real-time can be used to divide up a larger video conference into smaller video conferences. The logic can be seeded with metadata to ensure that the correct types of groups are created, depending on a variety of factors. For example, metadata might specify that groups should be optimized to include a dominant attendee or a knowledgeable attendee in each smaller group. Other metadata might request that smaller groups be created that are designed to create conflict or disagreements (for example, to debate a topic).

The system can continue to monitor interaction in the group settings and continue to modify its assessment of the optimal way to divide the groups and present the modified assessments to the organizer. This interaction information can even be used for future conferences, where the system can continually update the groups to work toward the best group mix to promote interaction.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multimaster serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone 191 to the processor 122 based on audio that is detected, such as via a user providing audible input to the microphone 191 as part of a video conference consistent with present principles. The system 100 may also include one or more cameras 193 that gather one or more images and provide the images and related input to the processor 122, such as for facilitating video conferencing consistent with present principles. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
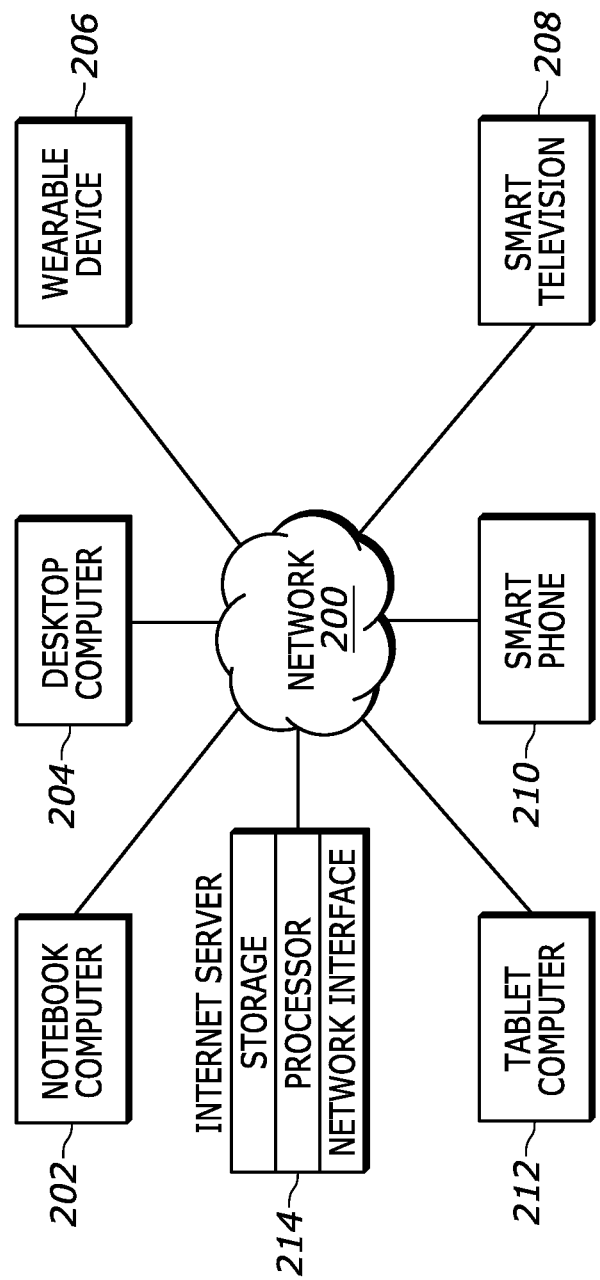
FIG. 2 is a block diagram of an example network of devices consistent with present principles.

Turning now to FIG. 2, example devices are shown communicating over a network 200 such as the Internet in accordance with present principles, such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
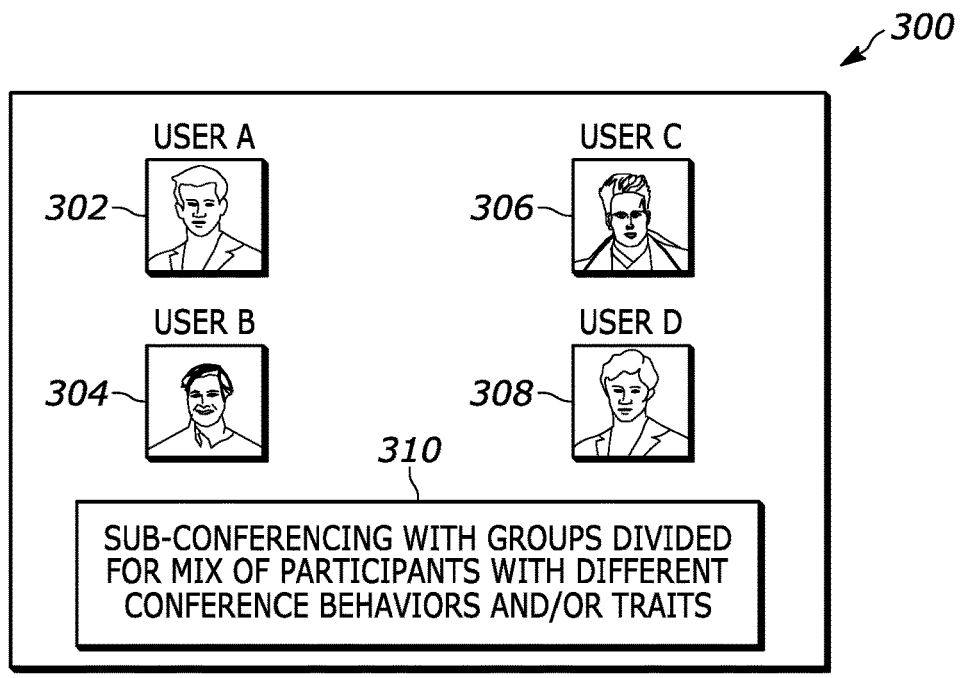
FIG. 3 shows an example graphical user interface (GUI) prior to a group being broken up for sub-conferencing.

Referring now to FIG. 3, it shows an example graphical user interface (GUI) 300 that may be presented on the display of an end-user's device, such as the laptop computer or smartphone of a video conference organizer like a school teacher, project leader, company director, etc. Four additional participants beyond the organizer are shown in FIG. 3 and are generally labeled User A, User B, User C, and User D. However, in other examples the actual first and last name of each respective participant may be presented. Additionally, note that while four participants are shown as an example, more or less participants may be included in the video conference.

As also shown in FIG. 3, the GUI 300 may include a respective real-time video feed 302-308 of the face of each participant while participating in the video conference. Further, consistent with present principles the GUI 300 may include a selector 310. The selector 310 may be selectable to initiate sub-conferencing of different groups of the participants, where the participants may be divided into different groups to mix participants with different traits and/or that have exhibited different conference behaviors from each other in the past (or the same or similar behaviors, in other examples).

Accordingly, selection of the selector 310 may command a conferencing software system, as may be executing at the organizer's device and/or a server in communication with the organizer's device, to facilitate conferencing to autonomously group the participants for sub-conferencing according to the traits and/or past conferencing behaviors of the respective participants. Responsive to the grouping, the GUI 400 of FIG. 4 may then be presented on the display of the organizer's device, as provided by the conferencing system software.

Figure 4:
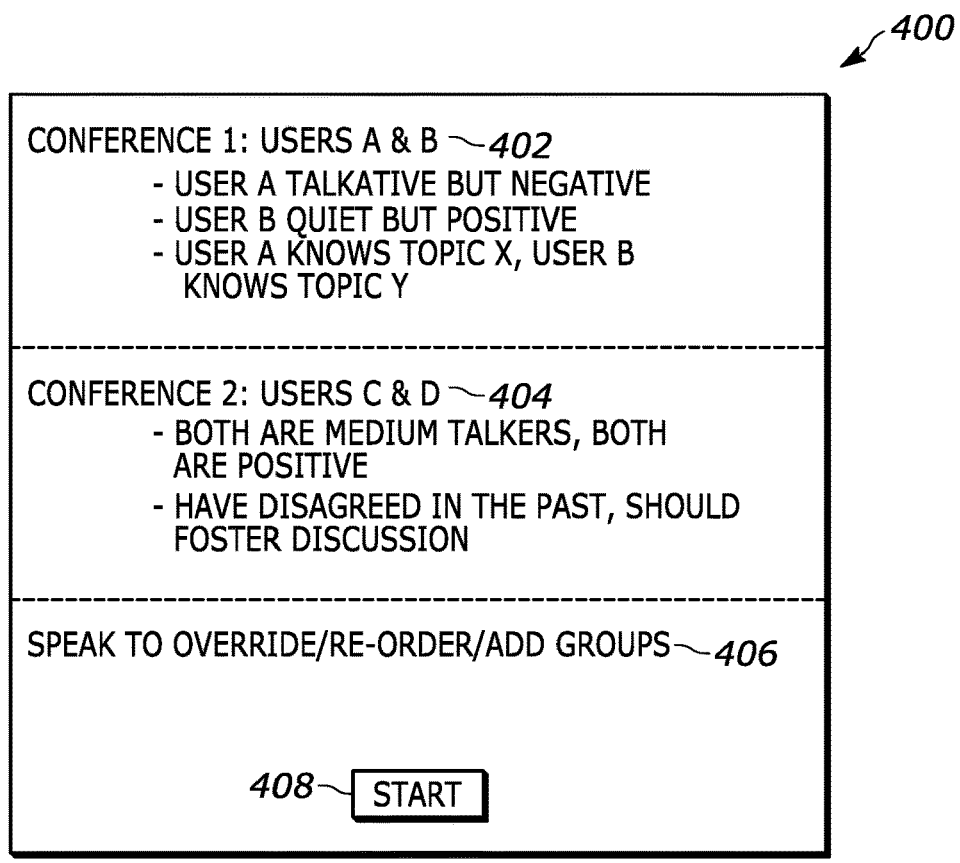
FIG. 4 shows an example GUI demonstrating how participants may be broken up for sub-conferencing.

As shown in FIG. 4, the GUI 400 may include a first section 402 indicating information about a first grouping of participants for a first sub-conference and a second section 404 indicating information about a second grouping of participants for a second, different sub-conference. As shown, each section 402, 404 may indicate which particular participants have been divided into which group. According to the example shown in FIG. 4, Users A and B have been grouped together for one sub-conference while Users C and D have been grouped together for another sub-conference.

Furthermore, in some examples each section 402, 404 may indicate one or more bases for the respective grouping. Thus, according to section 402, Users A and B have been grouped together based on Users A and B exhibiting different video conference behavior in the past during past conferences. In particular, User A has been determined from past conferences to be talkative but negative in his/her visual and verbal sentiments, while User B has been determined from past conferences to not be talkative but still positive in his/her visual and verbal sentiments. Visual and verbal sentiments may be identified using sentiment analysis and/or emotion recognition, for example. Also note that section 402 indicates that Users A and B have been grouped together based on the users respectively knowing different topics, generally designated "X" and "Y" here for simplicity. The topics themselves may have been previously indicated by the organizer, e.g., while setting up the general video conference shown in FIG. 3 before the groups were divided up. Or as another example, the topics may be recurring topics discussed at each past conference.

Additionally, according to section 404 in this example, Users C and D have been grouped together based on Users C and D both exhibiting moderate talking behavior and generally positive sentiment in the past during past conferences. Also note that section 404 indicates that Users C and D have been grouped together based on those two people disagreeing with each other during past conferences, which may be beneficial as it may foster robust discussion amongst the two of them for the current sub-conference into which they have been placed.

FIG. 4 also shows that the GUI 400 may include an indication 406. As shown, the indication 406 may include text instructing the organizer to speak in order to override or re-order the groupings and/or to add additional groups so that three or more sub-conferences may be created from amongst the participants (rather than only two sub-conferences). However, since only four participants are being discussed in this example, only two groups will be discussed below with it being further understood that if, for example, there were nine participants then the organizer may provide a command that three groups of three participants be formed rather than two groups consisting of the nine participants as might have been autonomously formed by the conferencing system itself.

In any case, the organizer may speak in natural language to override or re-order the groupings and/or to add additional groups. A microphone on the organizer's device may detect the organizer speaking in natural language and provide the audio input to the conferencing system. The system may then execute natural language understanding using the audio input to decipher the organizer's intent and reorder the groupings or add groupings based on the organizer's intent. For example, the organizer might say "put Users A and C in one group and Users B and D in another group", and the system will act accordingly. As another example, if the organizer were an elementary school teacher, the organizer might say "put all the boys in one group and all the girls in another group" and thus the system may re-order the groups to group the participants together by gender. The regrouping may then be shown on the GUI 400 by modifying sections 402, 404 to reflect the reordered groups and bases for the new groupings.

Once the reordering has been performed, or if the organizer was satisfied with the groupings selected by the conferencing system, the organizer may select the start selector 408, e.g., using touch or cursor input. Selection of the selector 408 may command the conferencing system to initiate and facilitate the video conferencing of the different groups as reflected in FIG. 5.

Figure 5:
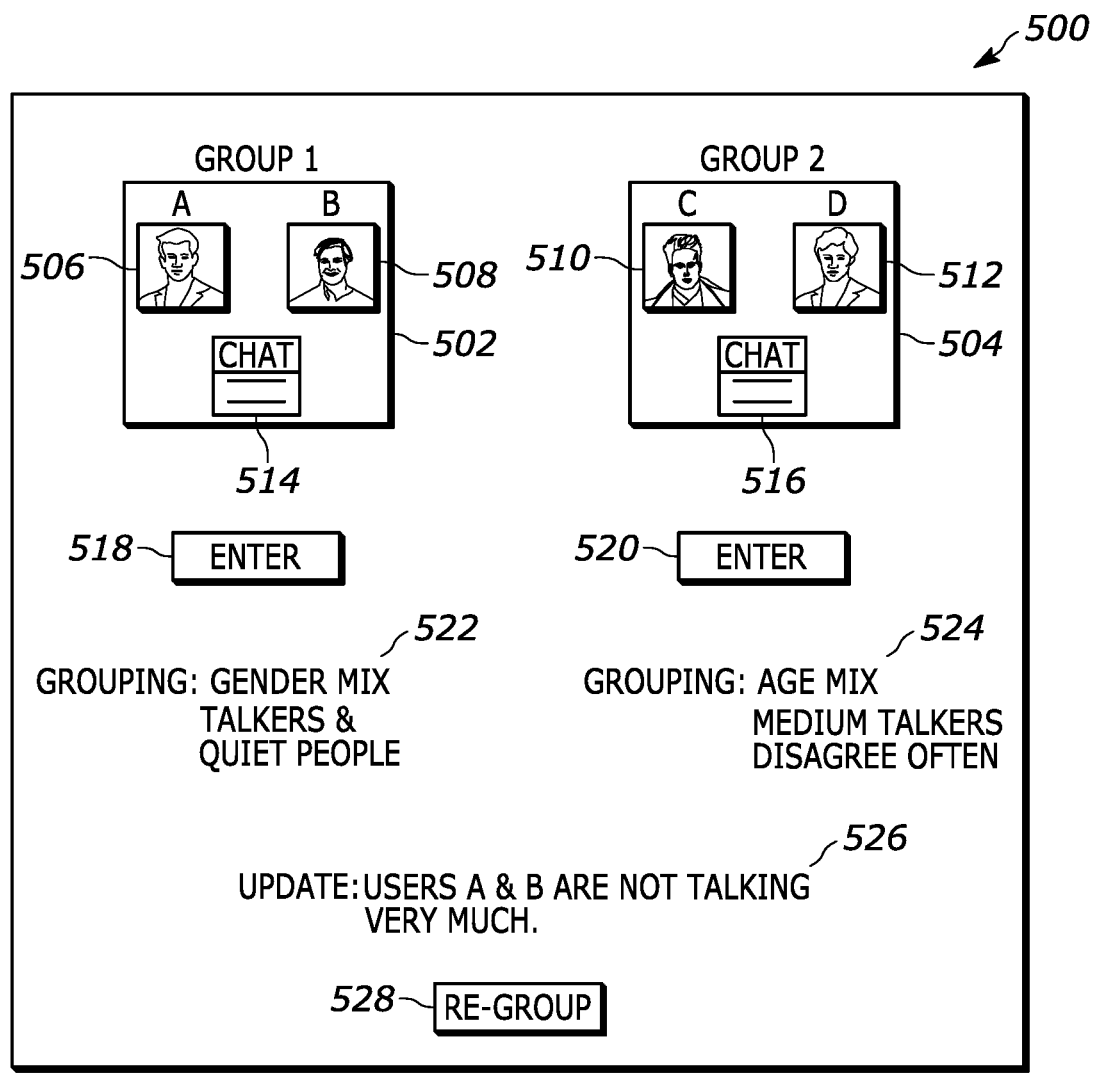
FIG. 5 shows an example GUI that a conference organizer may use to enter the various sub-conferences while they are transpiring.

Accordingly, attention will now be focused on FIG. 5, which shows an example GUI 500 that may be presented on the display of the organizer's device during the sub-conferencing. The GUI 500 may be presented for the organizer to get an overview of the sub-conferences and "check in" on a sub-conference by "entering" the sub-conference to audibly converse with the participants of that group and possibly also have the organizer's video feed presented to those other participants at their own respective devices. However, in other example embodiments the video feed of the organizer might always be shown to the participants of each sub-conference even though the organizer may elect "enter" one or the other of the sub-conferences for audible conversing and possibly text chatting as will be described further below. Also note that although sections for only two sub-conferences are shown, a respective section may be presented on the GUI 500 for each sub-conference that is concurrently transpiring even if greater than two.

In any case, as shown in FIG. 5 the GUI 500 may include sub-conferencing windows 502, 504 indicating respective thumbnail video streams 506-512 for the respective participants. The windows 502, 504 may also show a respective chat box 514, 516 showing a message chain of text message chatting between the respective participants of the respective sub-conferences.

As also shown in FIG. 5, the organizer may select either the enter selector 518 or enter selector 520 to virtually enter the first or second sub-conference, respectively. Upon entering, the organizer may at least converse audibly in the first or second sub-conference so that input to the organizer's microphone of the organizer speaking may be streamed to participants of the first or second sub-conference (but not participants of the other sub-conference). Again note that real-time video of the organizer may continue to be streamed to the participants of both sub-conferences, or that video may only be streamed to participants of a sub-conference that the organizer has virtually entered via selection of the selector 522 or selector 524.

Additionally, note that in some examples virtually entering a respective sub-conference may also enable the organizer to engage in text chatting that would be included in the message chain indicated by the respective box 514, 516 so that other participants of the same sub-conference can see the organizer's text chat (while participants of the other sub-conference may not). Additionally, note that while the selectors 518, 520 are shown as being different from each other, in other examples a single toggle button may be presented to toggle between entering the two sub-conferences (e.g., where only two are concurrently ongoing).

As also shown in FIG. 5, the GUI 500 may specify one or more respective parameters 522, 524 used by the conferencing system to create the respective groupings shown in the windows 502, 504. In this example, the parameters 522 listed for Group 1 include a mix of people of different genders and a mix of talkative people with non-talkative people. Also according to this example, the parameters 524 listed for Group 2 include a mix of people of different ages along with a grouping of medium talkers together. The parameters 524 also include a mix of people that disagree often on whatever they might be discussing.

As the sub-conferences continue, the conferencing system might continue to analyze the natural language and/or sentiments of the various participants. If the system determines that an unexpected outcome is occurring, such as neither of User's A and B talking in Group 1 even though one of them was previously designated as a voluminous talker, the GUI 500 may indicate as much via indication 526. Then if the organizer so-chooses, he or she may select the selector 528 to command the conferencing system to autonomously re-group the participants of Group 1 and Group 2 to form two new respective groups comprised of different combinations of the participants. To do so, the system itself might choose to weight different parameters differently (or not use certain parameters at all) to result in a different grouping of Users A, B, C, and D.

Figure 6:
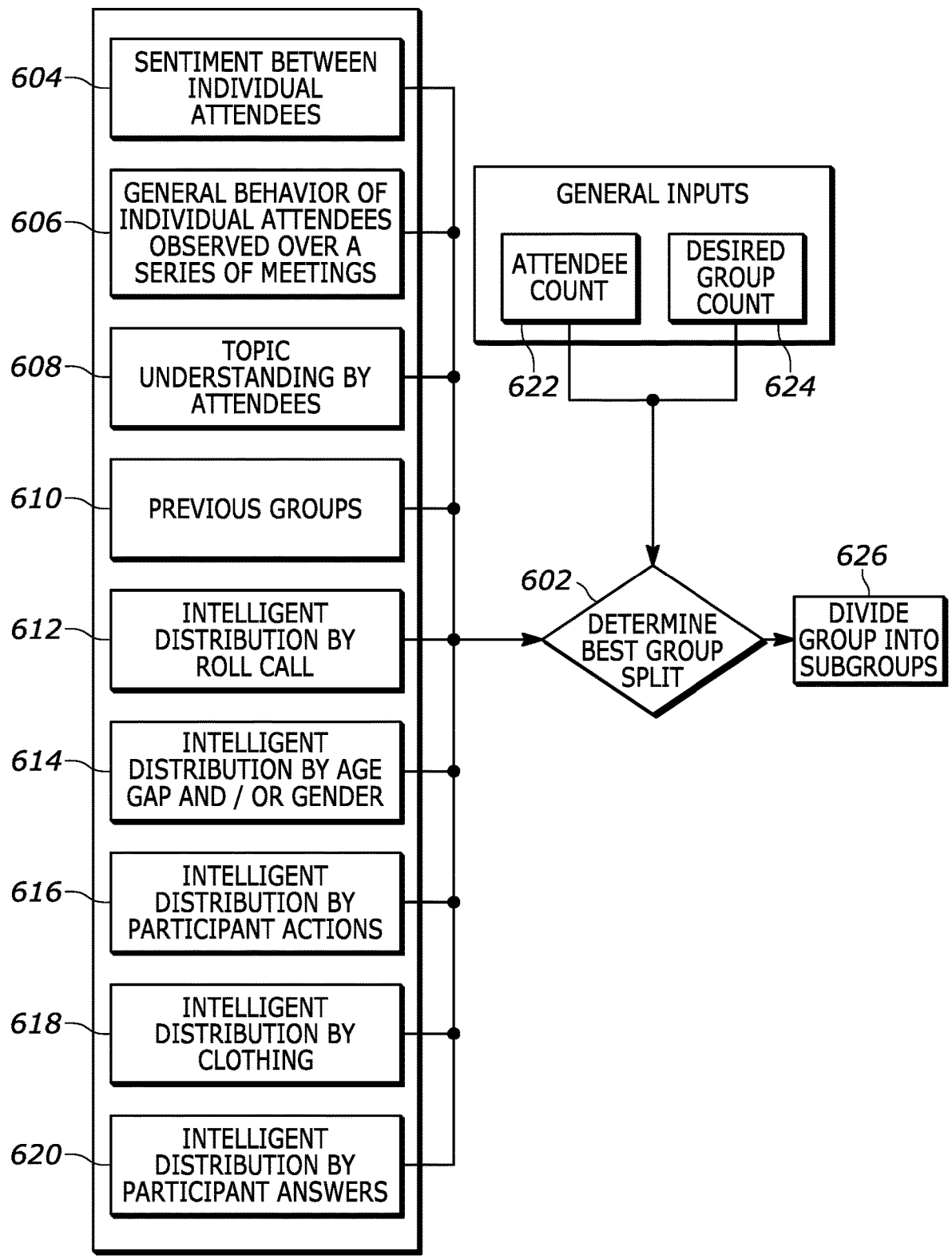
FIG. 6 is a schematic showing different data types and parameters that may be used to break up video conference participants into smaller groups for video sub-conferencing.

Now describing FIG. 6, it shows a schematic diagram of different types of parameters and data that might flow into decision logic executed by a conferencing system as described herein in order to separately group various participants for video conferencing. As shown, decision diamond 602 to determine a "best" group split can be based on sentiment between individual attendees/participants 604. Sentiment between individual attendees 604 might include negative interaction between attendees. For example, the system may identify situations where an attendee is talking but appears to be cut off by another attendee repeatedly, resulting in negative sentiment being exhibited (e.g., a face scowl). Thus, sentiment analysis may also be used to determine if an attendee is responded to in a negative or frustrated fashion by other attendees. Additionally, the system can attempt to identify defined patterns of negative interaction that might determine that a particular attendee is very dominant in a conversation. For example, when "Attendee A" begins to talk, other attendees then mute their own respective microphones and stop talking as part of the conference.

In terms of sentiment between individual attendees 604 that might include positive interaction between attendees, the system may monitor for situations where an attendee speaks, but then is followed by another attendee speaking to thus determine that normal patterns of dialog are occurring, which it would deem as "positive". E.g., sentiment analysis can be used to determine if the responding attendee is responding in a positive fashion with exclamations classified as positive.

Decision diamond 602 can also be executed based on the general behavior of individual attendees over a series of past conferences 606. The general behavior might include average talking time during the past conferences. For example, the system can create groups of attendees that talk roughly the same average amount of time (e.g., to within a threshold tolerance), and/or groups of attendees that include high-volume talkers and low-volume talkers so that low-volume talkers are not placed in the same group. Note also that while the talking time averages over a single past conference might be used, there may be instances where a particular past conference included topics not of interest to a particular attendee or where the attendee did not talk very much for whatever reason, and so where data is available for plural past conferences that data may be used to determine a talk time average across multiple meetings to hopefully result in a more-accurate average.

Still in reference to the general behavior of individual attendees over a series of past conferences 606, in addition to using talk time relative to other attendees talking for less time individually (to determine a high-volume talker), high-volume talking might also be established as talking for at least a threshold amount of total talk time amongst all attendees or at least for threshold amount of the total duration of the conference itself (e.g., 50%). Likewise, in addition to using talk time relative to other attendees talking for more time individually (to determine a low-volume talker), low-volume talking might also be established as talking for less than a threshold amount of total talk time amongst all attendees or less than a threshold amount of the total duration of the conference itself (e.g., 10%). Thus, in some examples the system can create groups that have a similar average talking time, such that no groups might be too quiet.

General behavior of individual attendees over a series of past conferences 606 might also include average sentiment. For example, the system can create groups of attendees overall exhibiting positive or negative sentiment (over one or more past conferences) to create a balanced group in which overall positive attendees are placed with overall negative attendees if desired. Overall sentiment may be determined by adding up all time during which positive sentiments were exhibited and all time during which negative sentiments were exhibited and selecting overall positive or negative sentiment based on which type was exhibited for more time.

Decision diamond 602 may also be executed based on topic understanding by attendees 608. Here, the system may implicitly determine an attendee's understanding using an agenda (e.g., provided by the conference organizer) and recording the interaction of attendees during each section of the agenda (e.g., before the attendees are broken up into sub-groups, from interactions in past conferences, etc.). In situations like this, the system can execute topic segmentation to note if certain attendees speak more during certain topics or sections of the agenda, which might indicate interest or confidence in a given topic specified in the agenda. Also here, the system might explicitly determine understanding using a quiz or poll presented to each attendee on their own respective display to determine topic understanding based on attendee responses to questions about the topic from the quiz/poll.

Still further, decision diamond 602 may also be executed based on previous groups 610. For example, in some situations a new combination of attendees may be selected over using an old combination of attendees (from past meetings as indicated in a meeting history). For example, the organizer may provide a verbal command for the system to "form new groups of people that have not been placed together in combination before" and the system may act accordingly based on natural language processing. However, in other situations the organizer may wish to use old group formations and provide a verbal command for the system to "re-form old groups of people that have been placed together in combination before" and the system may act accordingly.

Decision diamond 602 may also be executed based on intelligent distribution by roll call 612. For example, the organizer or host can verbally specify the names of individual attendees that are to be grouped together. The system may identify those names using natural language understanding and a roster listing all attendees to parse and group the named people together according to the organizer's verbal instructions to the system. For example, the organizer might indicate, "Abby, Billy and Nate go in one group, Tom and Peter go in another group" and the system may form the video conference groups accordingly. In some examples, these actions by the organizer might override or edit the system's initially-determined group combinations.

In addition to or in lieu of the foregoing, decision diamond 602 may also be executed based on intelligent distribution by age gap and/or gender 614. For example, the system may using computer vision, facial recognition, and/or other image processing technologies to approximate the respective ages or age ranges of each attendee. The system may then determine age gaps between the attendees and group the attendees together so different ages or age ranges are represented in each group or that so similar ages or age ranges are represented in each group. Similarly, the same technologies may also be used to identify the gender of each attendee and group the attendees together so the groups have a mix of genders or are each composed of attendees of the same gender.

So, for example, here too the organizer may verbally command the system that "all minors go in one group, all adults in another group" and the system can execute natural language processing to identify the command and form the video conferencing groups accordingly. As another example, the organizer can verbally command that all females be assigned to one group and all males be assigned to another group. Or a combination may be used where, for example, the organizer is an elementary school teacher and commands the groups be formed based on "girls going to group A, boys going to group B, and parents going to group C."

Decision diamond 602 may also be executed based on intelligent distribution by participant actions 616. For example, the organizer, while video conferencing with all attendees before the attendees are broken up into sub-groups, may instruct the attendees to perform a certain action. The system may then execute computer vision and/or gesture recognition using the video streams of the attendees to pair together people that do the same action or do the same action near the same time (e.g., within a threshold time of each other). For example, the organizer can ask the attendees to either cross their arms or raise a hand so that all attendees that do the same one of those two actions within a threshold time are grouped together.

As still another example, decision diamond 602 may also be executed based on intelligent distribution by clothing 618. For example, the attendees may be wearing one color of t-shirts or another (e.g., some wearing blue, some wearing red). The organizer may then verbally command the system to group all people with the same t-shirt colors together so that all blue t-shirt people are placed in one video conference and all red t-shirt people are placed in another video conference. Thus, here too computer vision may be executed for the system to differentiate attendees by clothing attributes such as color (and/or styling).

As yet another example, decision diamond 602 may be executed based on intelligent distribution by participant answers 620. So, for example, the organizer might provide instruction to the attendees and ask them a question. Based on how the attendees answer, they may be grouped with others who provided the same or similar answers. Thus, here too natural language understanding may be performed for the system to categorize each attendee's answer and group them accordingly.

As an example of intelligent distribution by participant answers 620, the organizer may ask participants to say how many languages he/she speaks. Based on the participants' answers, the bilingual people may be placed in one group and trilingual people may be placed in another group. This may be based on, e.g., the organizer asking the participants to say the number of languages he/she speaks in a certain order. The organizer might say something like "Billy you first" and Billy might say "one". The organizer might call on Paul next and he might say "two". The organizer might then call on Aaron, who might say "three". Then Ginny might go next, saying she speaks "one". This may continue for other participants. The system may then group together people that responded "one", separately group people that responded "two", and separately group people that responded "three".

As also shown in FIG. 6, general inputs may also be used by the decision logic. These inputs might include an attendee count 622 of the total number of attendees to be broken up into sub-groups, as may be determined by the number of people connected to the overall video conference before it is broken up into sub-groups. Desired group count 624 may also be used, where the count 624 may be specified by the organizer and indicate how many attendees should be included in each sub-group. E.g., the organizer might verbally instruct the system to "form groups of six."

Concluding the description of FIG. 6, note that at step 626 the system may divide the attendees into sub-groups per the determination 602.

Figure 7:
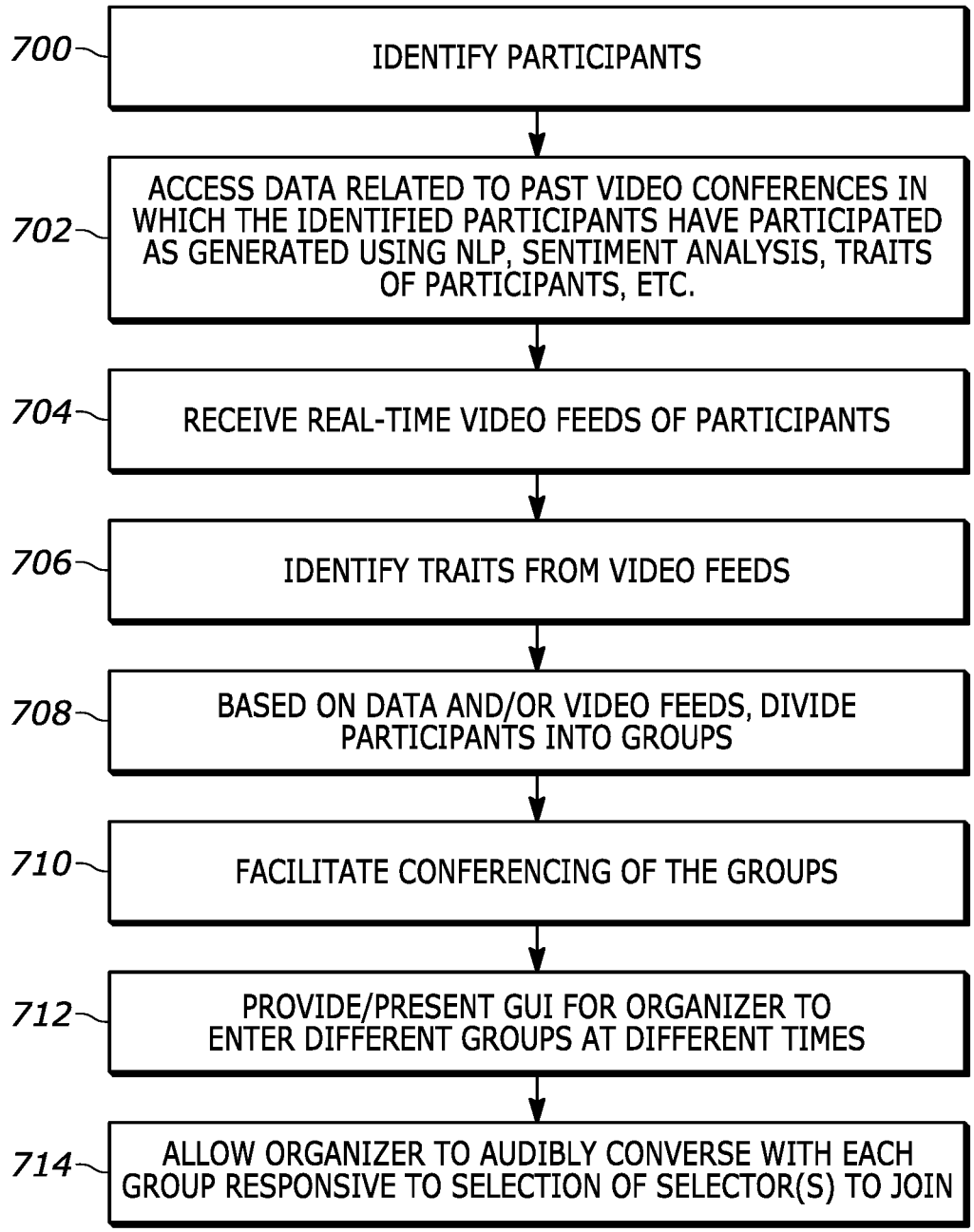
FIG. 7 shows a flow chart of an example algorithm that may be executed consistent with present principles.

Now referring to FIG. 7, it shows example overall logic consistent with present principles that may be executed by a device such as the system 100, a server hosting a conferencing system that facilitates conferencing and sub-conferencing, and/or a conference organizer's device (e.g., that might also host or facilitate the conferencing system). Thus, in some example implementations one or more of the steps of FIG. 7 may be executed by the server while other steps may be executed by the organizer's own personal device in any appropriate combination.

In any case, beginning at block 700 the device may identify the participants of a video conference or that are to participate in separate video conferences. The logic may then proceed to block 702 where the device may access data related to past video conferences in which the identified participants have participated, where the data may have been generated using natural language processing, sentiment analysis (e.g., using past audio of the participants and/or past images from video of the participants), traits of the participants, etc. For example, at this step the device may identify or access the data and/or parameters discussed above in reference to FIG. 6. The data itself (and even the related audio and video of the past conferences) may be accessed as stored in local storage, cloud storage, etc.

From block 702 the logic may proceed to block 704. At block 704 the device may receive real-time video feeds of the participants as streamed from cameras on their own respective devices. The video feeds received at block 704 may then be used at block 706 to identify one or more traits of the participants, such as those described above in reference to FIG. 6 (e.g., age, gender, color of clothing, etc.). The logic may then move to block 708.

At block 708 the device may, based on the data accessed at block 702 and/or video feeds received at block 704, divide the participants into different groups for video conferencing. Note that in examples where there may be a conflict as to which group a participant should be placed in since he/she might meet different criteria for separate groups, the logic may use a weighting to determine which criteria or parameters to weight more heavily than others, or which ones to select as dispositive over others, and thus give a higher priority to certain criteria when there is a conflict. The weighting may be preestablished by a system administrator, the conference organizer, another person, etc.

The logic may then proceed to block 710 where the device may initiate and/or facilitate the conferencing of the groups in two or more separate but concurrent video conferences, such as concurrent sub-conferences as described above. So, for example, after dividing up the participants into different conferencing groups, the device may then receive a respective audio stream detected by a microphone on a respective participant's device, receive a respective video stream detected by a camera on the respective participant's device, and receive respective text (e.g., for text chatting) provided using a keyboard on the respective participant's device. The device of FIG. 7 may then merge and route those streams to the other participants in real-time for presentation at the respective devices of the other participants.

After block 710 the logic may move to block 712. At block 712 the device may provide and/or present on a display a GUI for the organizer to then enter one video conference or another at different times to engage with the respective participants divided up into that respective video conference. For example, the GUI 500 of FIG. 5 may be transmitted from a server executing the logic to the organizer's personal device for presentation on the display of the organizer's personal device. Or the server may control software executing on the organizer's personal device to present the GUI 500 using the software executing locally on the organizer's device. Or if the organizer's personal device is executing some or all of the logic, the organizer's personal device may provide the GUI 500 by simply presenting the GUI 500 without control by a server or other device.

From block 712 the logic may then proceed to block 714. At block 714 the device executing the logic of FIG. 8 may allow the organizer to, upon entering one of the video conferences, audibly converse with the participants of that respective conference. Also note that at block 714 in some examples the organizer may enter a given conference to engage in text chatting and have his/her video feed transmitted to the participants of the respective conference. In any case, at block 714 the organizer may then continue to switch back and forth between entering one conference or another to audibly converse separately with that respective conference until conferencing has concluded or the conferences are merged back together into an overall conference with all participants.

Figure 8:
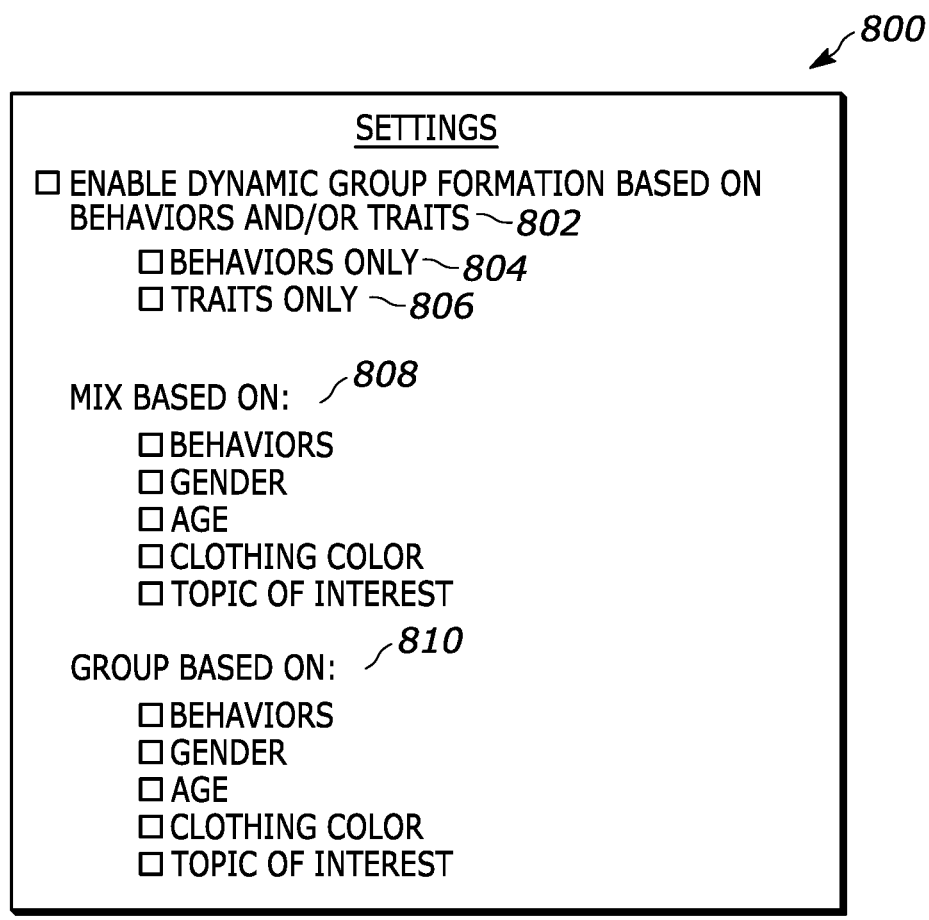
FIG. 8 shows an example GUI for configuring one or more settings of a conferencing system operating consistent with present principles.

Continuing the detailed description in reference to FIG. 8, it shows an example settings GUI 800 that may be presented on the display of a device for a conference organizer, a device of an administrator of the conferencing system itself, or the device of another person for configuring settings of the conferencing system. In the present example, each of the options to be discussed below may be selected by directing touch or cursor input to the respective check box adjacent to the respective options.

As shown in FIG. 8, the GUI 800 may include a first option 802 that may be selectable to set or configure the user's device and/or conferencing system to in the future undertake present principles, including autonomously dividing people up into groups for video conferencing as discussed herein and/or presenting a GUI such as the GUI 500. So, for example, option 802 may be selected to set or enable the device or system to present the GUI 500, to undertake the actions described above in reference to the GUI 500, to execute the actions described in reference to FIG. 6, to execute the logic of FIG. 7, etc.

As also shown in FIG. 8, the GUI 800 may include sub-options 804, 806 to, if desired, configure the system to only use participant behaviors, sentiments, and topic understandings for dividing participants into groups (option 804) or to only use traits such as age, gender, and clothing color for dividing participants into groups (option 806). Thus, if option 802 is selected but neither of options 804, 806 are selected, the system may use both.

If desired, in some examples the GUI 800 may even include respective options 808 to mix people based on different specific parameters so a group has participants that vary by behavior, gender, age, clothing color, topics of interest, or any other parameters discussed herein. For example, a group may be formed that includes different genders or people of different ages responsive to selection of a respective option 808.

However, the GUI 800 may also include respective options 810 to select different specific parameters for grouping people together that have the same behavior, gender, age, clothing color, topics of interest, or any other parameters discussed herein. For example, a group may be formed that includes people of the same gender or people of the same age or range responsive to selection of a respective option 810.

It may now be appreciated that present principles provide for an improved computer-based user interface that increases the functionality and ease of use of the video conferencing devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
at least one processor; and
storage accessible to the at least one processor and comprising instructions executable by the at least one processor to:
identify first, second, third, and fourth participants of a first video conference;
access data related to the first, second, third, and fourth participants, the data generated based on participation in the past of the first, second, third, and fourth participants in a second video conference, the second video conference being different from the first video conference;
based on the data, group the first and second participants together for a first sub-conference and group the third and fourth participants together for a second sub-conference different from the first sub-conference, the first and second participants not being grouped together with the third and fourth participants for the first and second sub-conferences; and based on the grouping, facilitate the first sub-conference of the first participant with the second participant and facilitate the second sub-conference of the third participant with the fourth participant;

wherein the first, second, third, and fourth participants are grouped together in the respective sub-conferences to create disagreement to debate a topic;

wherein the first and second participants are grouped together in the first sub-conference based on the first and second participants being identified as performing a same first gesture during the first video conference, and wherein the third and fourth participants are grouped together in the second sub-conference based on the third and fourth participants being identified as performing a same second gesture during the first video conference, the first gesture being different from the second gesture.

2. The apparatus of claim 1, wherein facilitating the first and second sub-conferences comprises presenting a graphical user interface (GUI) on a display, the GUI comprising video feeds of the first, second, third, and fourth participants according to the groupings, the GUI comprising a toggle button that is selectable to allow a fifth participant to toggle between conversing audibly in the first sub-conference and conversing audibly in the second sub-conference, the fifth participant being different from the first, second, third, and fourth participants.

3. The apparatus of claim 1, wherein the first, second, third, and fourth participants are grouped so that low-volume talkers from amongst the first, second, third, and fourth participants are not placed in the same one of the first and second sub-conferences.

4. The apparatus of claim 1, wherein the first and second participants are grouped together in the first sub-conference and the third and fourth participants are grouped together in the second sub-conference based on one or more of the first and second participants already having been grouped with one or more of the third and fourth participants in a past conference.

5. The apparatus of claim 1, wherein the instructions are executable to:

receive voice input from a conference organizer to override the grouping; and based on the voice input from the conference organizer to override the grouping, re-group the first, second, third, and fourth participants according to the voice input.

6. The apparatus of claim 5, wherein the instructions are executable to:

execute natural language understanding to determine how to re-group the first, second, third, and fourth participants.

7. The apparatus of claim 1, wherein the instructions are executable to:

prior to the first video conference and the first and second sub-conferences, present a settings graphical user interface (GUI) on a display, the settings GUI comprising an option that is selectable to set the apparatus to, for future video conferences, group participants together based on one or more criteria.

8. A method, comprising:

identifying first, second, third, and fourth participants that are to engage in video conferencing;

accessing data related to the first, second, third, and fourth participants, the data generated based on past video conference participation of the first, second, third, and fourth participants;

based on the data, grouping the first and second participants together for a first video conference and grouping the third and fourth participants together for a second video conference different from the first video conference, the first and second participants not being grouped together with the third and fourth participants for the first and second video conferences;

based on the groupings, providing a graphical user interface (GUI) presentable on a display, the GUI comprising video feeds of the first, second, third, and fourth participants according to the groupings, the GUI comprising a first selector that is selectable to allow a fifth participant to converse audibly in the first video conference, the GUI comprising a second selector that is selectable to allow the fifth participant to converse audibly in the second video conference, the fifth participant being different from the first, second, third, and fourth participants;

wherein the past video conference participation comprises participation in plural past video conferences, and wherein the first, second, third, and fourth participants are grouped together based on respective average talking times of the first, second, third, and fourth participants across the plural past video conferences, the average talking times indicated via the data;

wherein the first and second participants are grouped together in the first video conference and the third and fourth participants are grouped together in the second video conference based on one or more of the first and second participants already having been grouped with one or more of the third and fourth participants in a past conference.

9. The method of claim 8, wherein the method is executed at least in part by a server that facilitates the first video conference of the first participant with the second participant and that facilitates the second video conference of the third participant with the fourth participant.

10. The method of claim 8, wherein the first, second, third, and fourth participants are grouped by answers to a question posed by a conference organizer during a third video conference from which the first, second, third, and fourth participants are grouped into the first and second video conferences.

11. The method of claim 8, wherein the first and second participants are grouped together in the first video conference to create disagreement to debate a topic, and wherein the third and fourth participants are grouped together in the second video conference to create disagreement to debate the topic.

12. The method of claim 8, wherein the GUI is a first GUI, and wherein the method comprises:

prior to the first and second video conferences, presenting a settings GUI on the display, the settings GUI being different from the first GUI, the settings GUI comprising an option that is selectable to set an apparatus to, for multiple future video conferences, group participants together based on one or more criteria.

13. An apparatus, comprising:

at least one computer readable storage medium (CRSM) that is not a transitory signal, the computer readable storage medium comprising instructions executable by at least one processor to:

identify first, second, third, and fourth participants of a first video conference;

access data related to the first, second, third, and fourth participants;

based on the data, group the first and second participants together for a first sub-conference and group the third and fourth participants together for a second sub-conference different from the first sub-conference, the first and second participants not being grouped together with the third and fourth participants for the first and second sub-conferences; and based on the grouping, facilitate the first sub-conference of the first participant with the second participant and facilitate the second sub-conference of the third participant with the fourth participant;

wherein the first and second participants are grouped together in the first sub-conference based on the first and second participants being identified as performing a same first gesture during the first video conference, and wherein the third and fourth participants are grouped together in the second sub-conference based on the third and fourth participants being identified as performing a same second gesture during the first video conference, the first gesture being different from the second gesture.

14. The apparatus of claim 13, wherein the first and second participants are grouped together in the first sub-conference and the third and fourth participants are grouped together in the second sub-conference based on one or more of the first and second participants already having been grouped with one or more of the third and fourth participants in a past conference.

15. The apparatus of claim 13, wherein the first, second, third, and fourth participants are grouped by answers to a question posed by a conference organizer during the first video conference.

16. The apparatus of claim 13, wherein the first and second participants are grouped together in the first sub-conference to create disagreement to debate a topic, and wherein the third and fourth participants are grouped together in the second sub-conference to create disagreement to debate the topic.

17. The apparatus of claim 13, wherein the instructions are executable to:

prior to the first video conference, present a settings graphical user interface (GUI) on a display, the settings GUI comprising an option that is selectable to set the at least one processor to, for multiple future video conferences, group participants together based on one or more criteria.

18. The apparatus of claim 13, wherein the instructions are executable to:

receive voice input from a conference organizer to override the grouping; and based on the voice input from the conference organizer to override the grouping, re-group the first, second, third, and fourth participants according to the voice input.

19. The apparatus of claim 13, wherein the instructions are executable to:

execute natural language understanding to determine how to re-group the first, second, third, and fourth participants based on the voice input.

20. The apparatus of claim 13, comprising the at least one processor.

* * * * *